H. B. REES.
ROLLER FOR HIDE UNHAIRING MACHINES.
APPLICATION FILED SEPT. 16, 1909.
959,262.
Patented May 24, 1910.
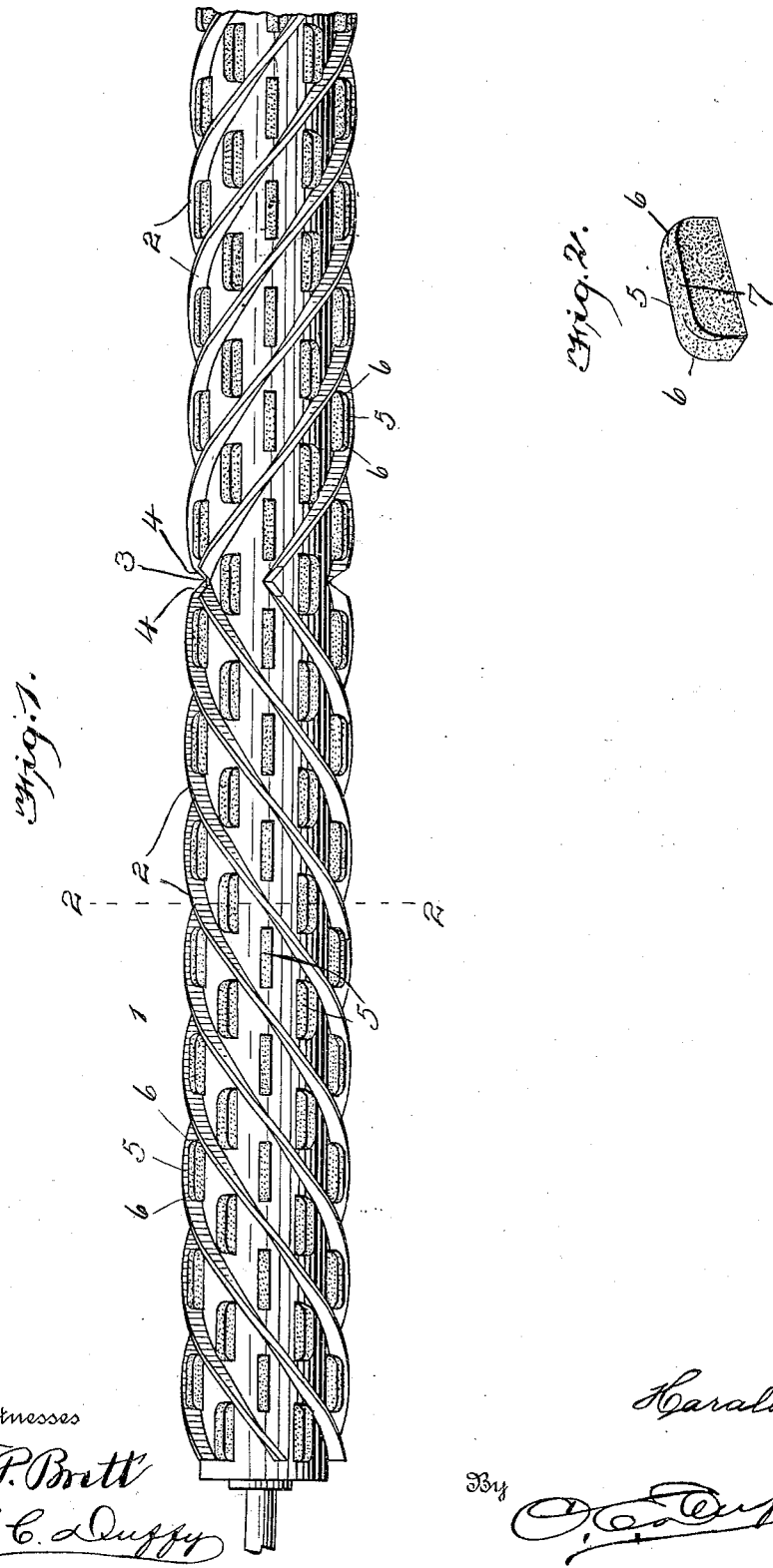

UNITED STATES PATENT OFFICE.

HARALD B. REES, OF ASHEVILLE, NORTH CAROLINA.

ROLLER FOR HIDE-UNHAIRING MACHINES.

959,262.   Specification of Letters Patent.   Patented May 24, 1910.

Application filed September 16, 1909. Serial No. 518,111.

*To all whom it may concern:*

Be it known that I, HARALD B. REES, a citizen of the United States, residing at Asheville, in the county of Buncombe and State of North Carolina, have invented certain new and useful Improvements in Rollers for Hide-Unhairing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to the construction of cylinders for hide unhairing machines and has for its object to provide a cylinder, the working blades of which are of natural stone or a stone composition. The action of these blades on the hide is less harsh and damaging than the usual steel blades now employed on cylinders of this character.

The usual construction of a cylinder in an unhairing machine embodies a series of helical steel blades termed the spreading blades and a series of longitudinally arranged steel blades staggered over the periphery of the cylinder, which latter blades are the working blades. These short blades are of case hardened steel and are for the purpose of unhairing the hides. The disadvantages, however, of the steel working blades are that they are quite harsh in their action on a substance as tender as a hide and especially so when they have been newly sharpened, often doing considerable damage by scratching or tearing the hide, and if there is the slightest nick or other imperfection in the steel blade its action is particularly damaging to the hide or leather.

My invention consists in providing a cylinder for hide unhairing machines embodying a series of helically arranged spreading blades and a series of short longitudinally staggered stone working blades or more properly, blades of a natural stone or stone composition. The action of the stone working blades on the hide or leather is quite different from that of the usual steel blades, for the reason that the stone being of a very soft texture does not scratch or damage in the slightest degree the leather or hide subjected to the working pressure of the blades, and as the pull or friction of a stone blade is much greater than that of a steel blade it works the stock out much more thoroughly and with no tendency to damage.

Referring to the accompanying drawing: Figure 1 is an elevation of a cylinder for an unhairing machine constructed in accordance with my invention. Fig. 2 is a perspective view of one of the stone working blades.

Like numerals of reference indicate the same parts throughout the figures in which;

1 indicates the cylinder of an unhairing machine, the surface or periphery of which is provided with a series of helically arranged steel spreading blades 2, said spreading blades 2 meeting at the center of the cylinder as shown at 3, and the blades are tapered at 4 at their meeting points. Arranged longitudinally of the roller and on the surface or periphery thereof is a series of stone working blades 5, said blades being staggered as shown in Fig. 1 and are provided with rounded corners 6 and a rounded forward edge 7 as clearly shown in Fig. 2. The natural stone working blades 5 are applied to the cylinder in any suitable manner such as for instance by means of cement such as a mixture of litharge and glycerin.

In operation the steel spreading blades 2 work the hide out or spread the same while the working pressure of the stone working blades 5 on the hide unhairs the same, the blades 5 being staggered in such manner that the work not done by one blade is taken up by the next.

In practice I have found that the action of the stone working blades 5 is quite different from that of the usual steel working blades employed in rollers of this character, for the reason that while the stone working blades have a greater pull or friction on the hide than the steel blades the work of unhairing the hide is accomplished by the stone blades without any scratching or damage whatever to the hide; consequently I am enabled by the use of unhairing rollers provided with stone working blades as just described to quickly and easily unhair hides and set out and work leather of the most delicate texture and character without the slightest damage to the same.

Having thus fully described my invention what I claim as new and desire to secure by Letters Patent of the United States is:—

1. A cylinder for a hide unhairing machine comprising helically arranged metal spreading blades and a series of longitudinally arranged working blades, said longitudinally arranged working blades being constructed of a composition of stone and staggered over the periphery of the roller, substantially as described.

2. A cylinder for a hide-unhairing machine comprising helically arranged steel spreading blades and longitudinally arranged stone working blades, said longitudinally arranged stone working blades being staggered over the periphery of the cylinder.

3. A roller for a hide-unhairing machine comprising helically spreading blades and longitudinally arranged stone working blades, said longitudinally arranged stone working blades being staggered over the periphery of the cylinder.

In testimony whereof, I affix my signature, in presence of two witnesses.

HARALD B. REES.

Witnesses:
AMELIA T. VAN BERGEN,
ELIZABETH C. REES.